United States Patent [19]

Bubanko et al.

[11] 4,252,407

[45] Feb. 24, 1981

[54] FIBRE-TO-FIBRE CONNECTOR FOR MULTIFIBRE OPTICAL FIBRE CABLES

[75] Inventors: Vladimir Bubanko, Velizy; Michel Jurczyszyn, Ivry sur Seine; André Tardy, Saint Germain les Arpajon, all of France

[73] Assignee: Compagnie Generale d'Electricite S.A., Paris, France

[21] Appl. No.: 959,556

[22] Filed: Nov. 9, 1978

[30] Foreign Application Priority Data

Nov. 24, 1977 [FR] France ............... 77 35372
Aug. 29, 1978 [FR] France ............... 78 24864

[51] Int. Cl.³ .............................................. G02B 5/14
[52] U.S. Cl. ............................................. 350/96.21
[58] Field of Search ........................ 350/96.21, 96.22

[56] References Cited

U.S. PATENT DOCUMENTS

| | | | |
|---|---|---|---|
| 4,045,121 | 8/1977 | Clark | 350/96.21 |
| 4,050,783 | 9/1977 | Tardy | 350/96.21 |
| 4,088,386 | 5/1978 | Hawk | 350/96.21 |
| 4,102,561 | 7/1978 | Hawk et al. | 350/96.21 |

OTHER PUBLICATIONS

F. Thiel et al., "Optical Waveguide Cable Connection", in *Applied Optics*, vol. 15, No. 11, Nov. 1976; pp. 2785–2791.

*Primary Examiner*—Stewart J. Levy
*Attorney, Agent, or Firm*—Sughrue, Rothwell, Mion, Zinn and Macpeak

[57] ABSTRACT

Fibre-retaining grooves are formed in-between a set of fibre locating pins (M) laid side by side. The pins and a base plane (4) on which they are laid are made of hard, rigid material. Guidance for connection and disconnection is provided by guide pins (G1 to G4) of larger diameter which are therefore robust enough to stand up to handling. The guide pins are in direct contact with the locating pins in order to ensure positional accuracy.

17 Claims, 20 Drawing Figures

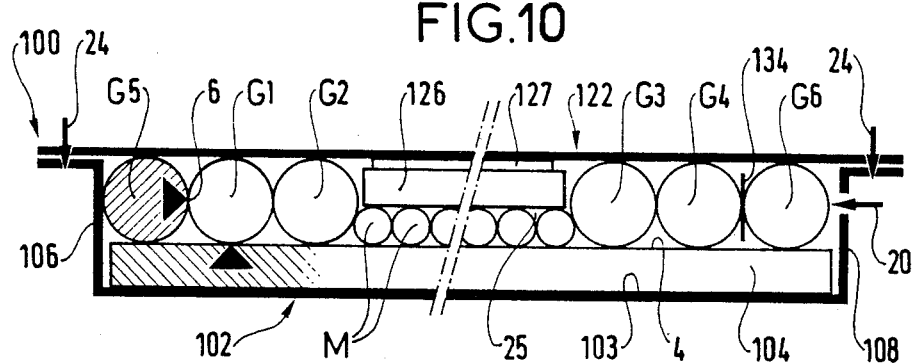
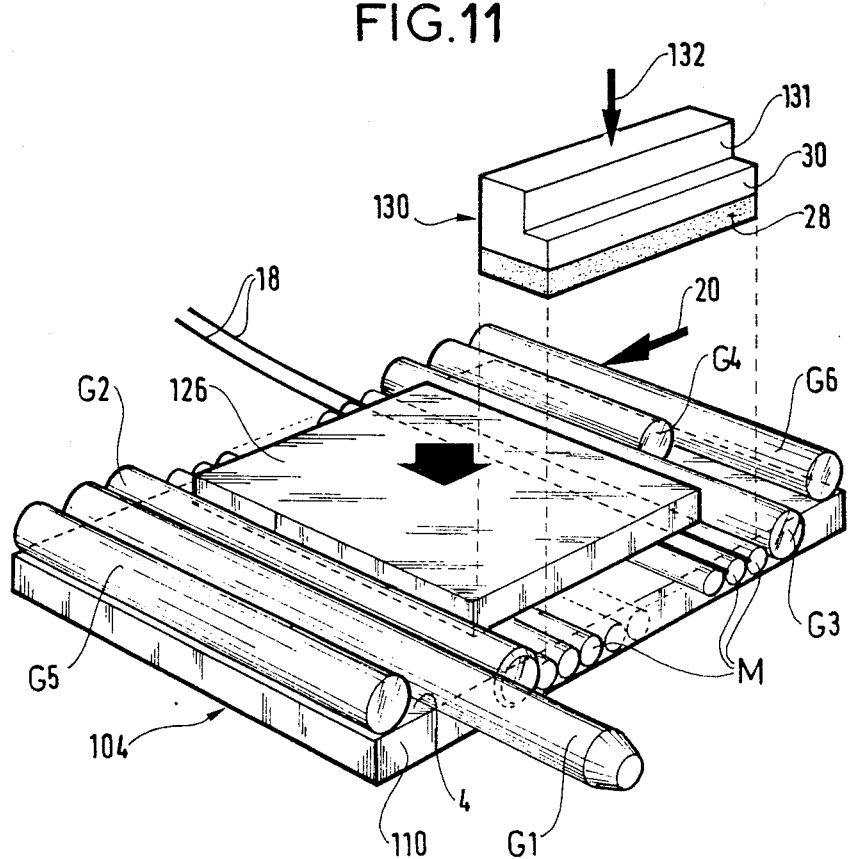

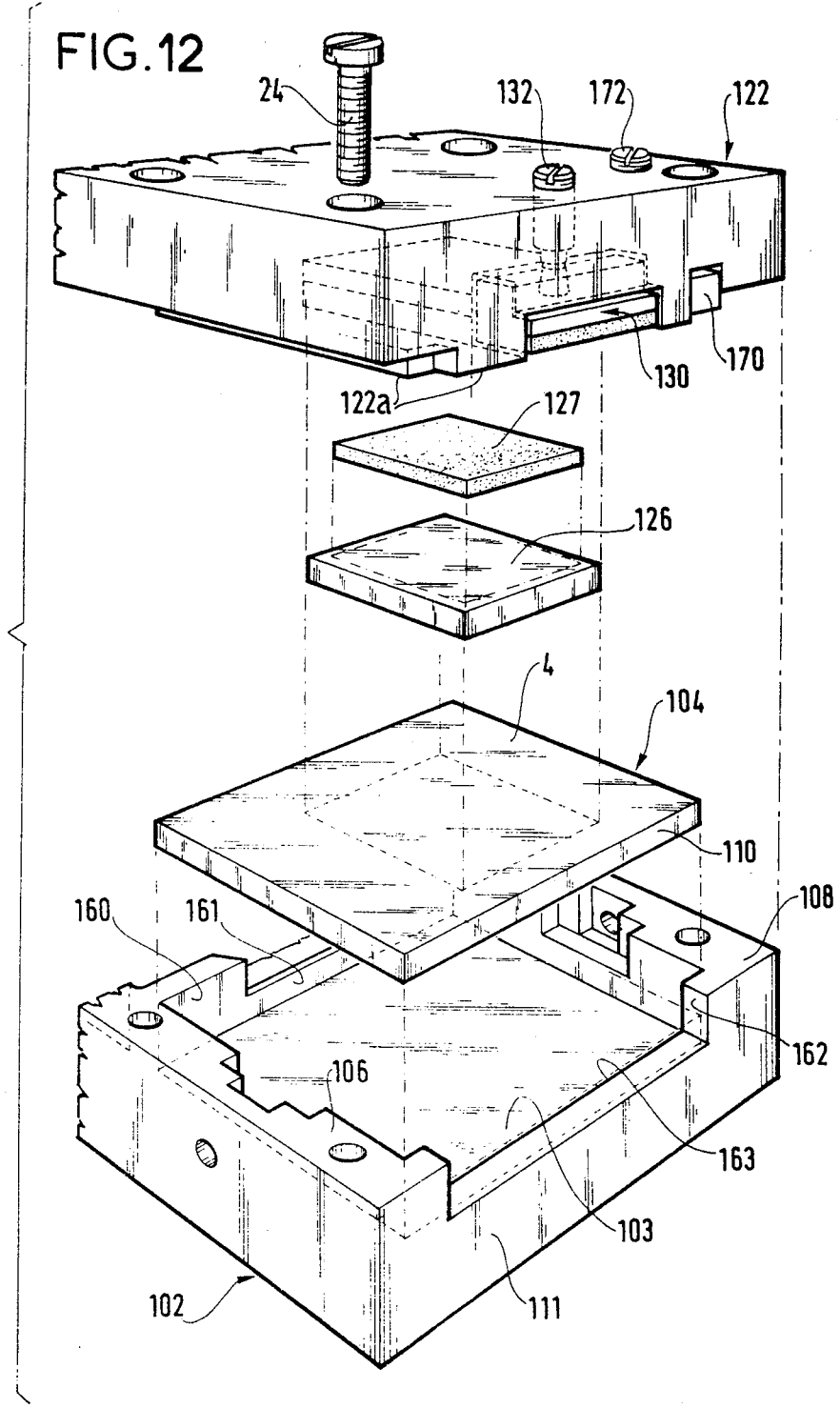

FIBRE-TO-FIBRE CONNECTOR FOR MULTIFIBRE OPTICAL FIBRE CABLES

FIELD OF THE INVENTION

The invention relates to a fibre-to-fibre connector for multifibre optical fibre cables.

BACKGROUND OF THE INVENTION

There are two main applications of data transmission by means of guided light waves:
  long-distance optical transmission of data and telecommunications signals,
  short-distance optical transmission of data onboard aircraft and ships and in industrial installations.

The first of these applications relies on optical cables in which each conductor or optical fibre is carrying data different from that carried by other fibres. Connections must be of the fibre-to-fibre type, and it is necessary to use a multicontact connector for connecting the individual fibres to one another.

The second application uses optical cables in which each conductor consists of a number of fibres. Within a given conductor, each fibre carries the same data as the neighbouring fibres. An overall conductor-to-conductor connection can be made, using an optical mixer which generally comprises a glass cylinder with two indices of refraction, the central section being aligned with the hexagonal array formed by the fibres of the cable. This produces a connection loss, which increases with decreasing values of the stacking coefficient, which is the ratio between the total cross-section of the fibre cores and the cross-section of the mixer core. This loss is generally of the order of 50%, or 3 dB, and is added to the losses caused by mechanical manufacturing tolerances and the mechanical tolerance in respect of the connecting members of the connector assembly. Thus a fibre-to-fibre connection is also advantageous in this second application.

The present invention is concerned with both of the main applications mentioned hereinabove.

The difficulty in producing fibre-to-fibre connectors results from the need to obtain an alignment of the fibres which is sufficiently accurate to give minimum coupling losses, of less than 1 dB, for example. If the core diameter of the fibres is, for example, 100 microns, the core being covered with cladding with a lower index of refraction, the difference being between $5.10^{-3}$ and $10^{-1}$, the connectors must be capable of locating the fibres within the following tolerances: the distance between the facing ends of the fibres must be less than 20 microns; the relative eccentricity must be less than 4 microns; and the relative inclination must be less than 1 degree. These tolerances are larger if the medium separating the two fibres is matched in terms of the index of refraction: 50 microns for the distance and 10 microns for the eccentricity, the maximum relative inclination being the same. In view of the small diameter of the fibres, it is difficult to remain within these tolerances.

Various attempts at solving the problem thus posed are now outlined. To facilitate the description the term "connector assembly" is used to designate the assembly of two complementary "connectors" which cooperate with one another to connect two cables, each connector being connected by a rear part to the end of one cable. The set of components in each connector which holds the end of a single fibre will be called a "contact". Thus each connector comprises as many contacts as there are fibre in the cable, its contacts being in the front part of the connector.

French published patent application No. 2,282,650 (Corning Glass Works) corresponds to U.S. Ser. No. 498,329 (Hawk) now abandoned and describes a "connector assembly for optical wave guides". This connector assembly uses two similar connectors each of which has a connection surface which cooperates with a connection surface of the other. On one of the connectors this surface is described as an upwardly facing surface while on the other it is described as a downwardly facing surface. These surfaces are applied against each other to establish a connection. In the first connector the fibres are fixed in a part of the connector which is behind the connection surface (i.e. to the cable end of it) and they extend halfway along the surface. They are laid along the rear half portions of V-shaped grooves formed between cylindrical pins which extend side by side along the connection surface to the frontend of the connection surface. These pins are pressed laterally against each other. It is essential for these pins to be made of flexible material since, when a connection is made, the connection surfaces are applied against each other in such a way that the front half portions of the pins of the second connector are applied in the fibre-bearing rear half portion of the V-shaped grooves of the first connector, thereby locking the fibres in their grooves. Likewise the fibres of the second connector (which extend half way along the rods of the second connector) are locked in the front half portions of the grooves of the first connector by the pins of the second connector and in line with the fibres of the first connector. If the pins were hard and rigid they would be in danger of damaging the fibres when the two connectors are clamped together. Unfortunately the flexibility of the pins results in inadequate lateral positioning of the fibres. Further, it is difficult to position the ends of the fibres exactly half-way along their respective pins, especially since the length of the flexible pins varies with the pressure applied thereto. Thus to avoid the possibility of the ends of the fibres overlapping and breaking each other it is necessary for a relatively large safety gap to be left between the ends of the fibres of the two connectors when assembled. There are thus drawbacks in using flexible material for the rods.

For this reason, it has been proposed elsewhere to locate each fibre in a channel formed by the facing lateral surfaces of three hard and rigid cylindrical locating pins. Highly accurate pins can be machined from hard steel at low cost. They are maintained parallel to one another and in contact at their lateral surfaces using appropriate clamping means. The fibre is held in the required position by the intermediary of an arrangement which guides the assembly of locating pins.

This guiding action can be much more accurate, as it is applied to an assembly which is much more robust and rigid and with much larger transverse dimensions than the fibre, which is accurately located along the axis of the assembly. The guide arrangement may itself consist of cylindrical pins of a hard rigid material, bearing on the outside surfaces of the locating pin assembly. An arrangement of this type is described in French patent of addition application No. 2,316,611, "Fibre locating device" and in the corresponding U.S. Pat. No. 4,050,783 (inventor: André TARDY).

The previously described arrangement is well suited to the fibre-to-fibre connection of multifibre cables when it is required to have the same hexagonal arrangement of contacts as applies to the fibres in the cable. This arrangement is not well suited to the production of connectors which can be stacked on top of one another for connecting a large number of multifibre cables in a small volume, maintaining the facility for readily modifying the connections between cables. Moreover, it is desirable to facilitate the connection of the connectors to the ends of the cables, in other words to provide for the rapid insertion of the set of fibres in the set of locating channels provided to receive them.

The present invention is intended to provide a fibre-to-fibre connector for multifibre optical fibre cables which can be easily connected to a cable and provides for low connection losses using readily stackable connectors, at moderate cost.

The present invention consists in a fibre-to-fibre connector for multifibre optical fibre cables, comprising:
- a "front" surface at which the connection is made,
- at least three hard, rigid cylindrical locating pins parallel to and in contact with one another along their side surfaces, their front ends being located in the vicinity of the front surface of the connector without projecting beyond the front face, and forming fibre-locating grooves between the facing portions of their side surfaces,
- lateral clamping means for urging the locating pins into contact with one another in the lateral direction,
- guide means for guiding the set of locating pins so as to act as a guide for optical fibres located in the locating grooves,
- a base providing on an upper surface thereof, a hard, rigid plane base surface providing a reference plane on which the locating pins are located,
- means for clamping the locating pins against the base surface to maintain contact between the lateral surfaces of the pins and the base surface,
- an elastic pad for immobilising the fibres disposed adjacent the front face, and
- means for clamping the elastic pad onto the locating pins with sufficient force to deform the pad where it contacts the pins and/or the fibres so that is presses the fibres into the locating grooves formed between the pins.

The connector preferably further comprises:
- a rectilinear side support surface extending parallel to and above the base surface,
- a cylindrical main guide pin forming part of said guide means and located on said base surface parallel to the lateral plane of contact of said base surface with said set of locating pins, the front end of said guide pin being offset forwards or backwards relative to the front edge of the connector to permit plug/socket cooperation of the connector and an associated complementary connector, and
- means for clamping the guide pin against the base surface.

The longitudinal location of the connector is preferably obtained by virtue of the fact that it comprises:
- two cylindrical stop pins located on said base surface parallel to and one on each side of said locating pins, said stop pins being clamped in the lateral direction by said lateral clamping means, and their front surfaces constituting the plane stop surfaces perpendicular to the pin axes, and
- means for clamping said pins against the base surface,
- the front ends of the locating pins being offset backwards relative to the stop surfaces so as to avoid said front ends coming into contact with the front surfaces of the locating pins of a complementary connector, the offset distance being less than 0.02 millimeters.

The invention will now be described, by way of non-limiting example only, and with reference to the accompanying diagrammatic drawings comprising FIGS. 1 to 20.

Components appearing in more than one figure are designated by the same reference.

BRIEF DESCRIPTION OF THE FIGURES

FIG. 10 is a schematic representation of a second embodiment of a connector in accordance with the invention, showing the general arrangement of the principal components and the bearing and clamping forces applied thereto, these forces being designated by the same reference numerals as the screws which are used to apply them.

FIG. 11 is a partial schematic representation in perspective, showing the general arrangement of the principal components of the same connector.

FIG. 12 is an exploded partial perspective view of the casing, showing the clamping plates and the fibre immobilising pad.

DESCRIPTION OF PREFERRED EMBODIMENTS

Figure 1:
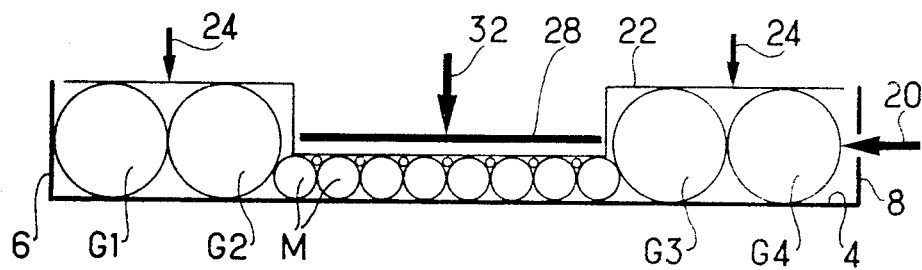
FIG. 1 is a front view elevational of a first embodiment of a connector in accordance with the invention, showing the relative positions of the principal components of the connector and the bearing and clamping forces applied to these components, these forces being shown by arrows marked with the same reference numerals as are used for the screws with which these forces are applied.
Figure 3:
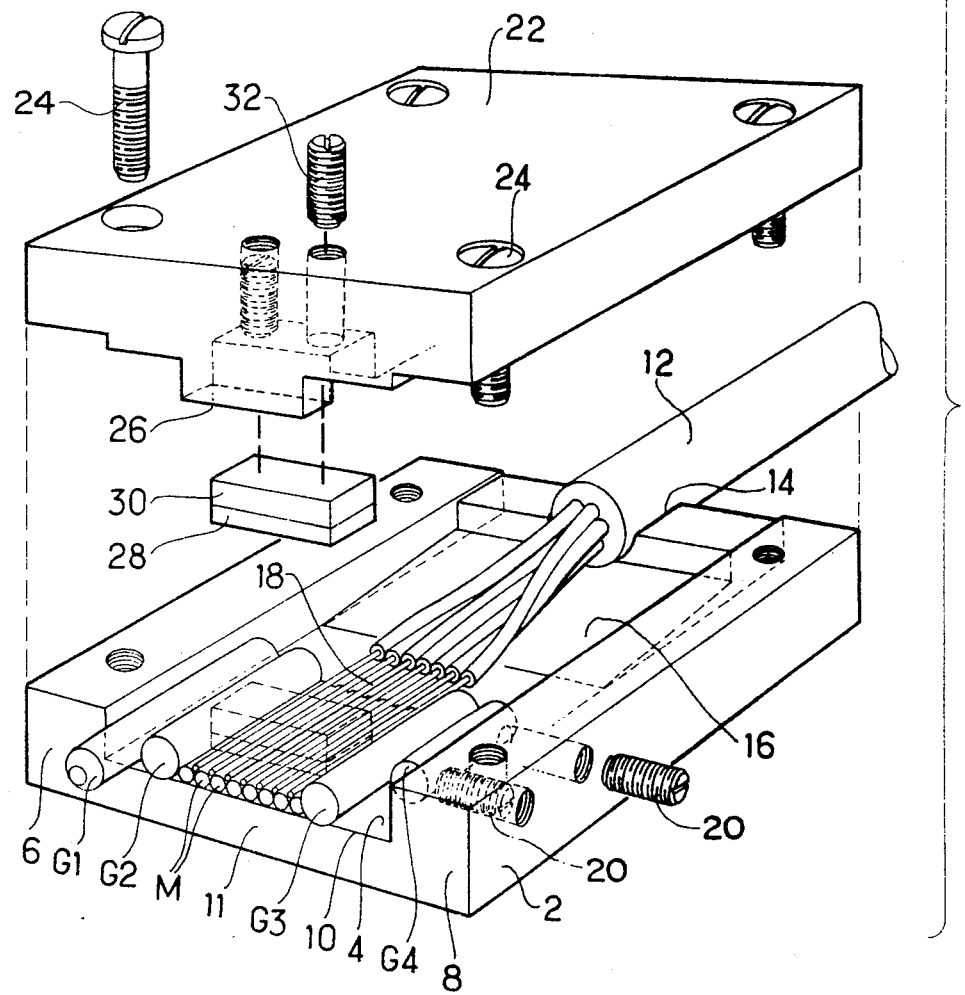
FIG. 3 is a perspective exploded view of the same connector, this view showing that the connector is of the plug type.

The connector in accordance with a first embodiment of the invention comprises a prism-shaped metal base 2 which is of U-shaped cross-section (compare FIG. 3) and whose internal surfaces are machined flat. The horizontal centre section of the U has a width greater than the height of the vertical side sections. The upper surface 4 (the only part of the base shown in FIG. 1) constitutes the previously mentioned "base surface". This surface provides a reference plane, horizontal in this example, accurately machined from a hard, rigid metal. One of the vertical side sections 6 of the U constitutes the rectilinear lateral support surface mentioned above. For this reason, its plane inwardly facing surface is also accurately machined. In practice, the inwardly facing surfaces of both vertical side sections 6 and 8 are machined in the same manner so that either section can be used as the lateral support surface, depending on whether a plug or socket connector is to be formed (see below), the base 2 being totally symmetrical.

The base surface is rectangular and has a front edge 10 (FIG. 3), a rear edge opposite the front edge, and two lateral edges at which it intersects the side sections 6 and 8 of the U. The base 2 has a plane front surface 11 which is perpendicular to the generatrices of the prism which define the longitudinal direction, this surface intersecting the base surface 4 at the front edge 10. The optical fibres are connected at the front edge, which must be located opposite the front edge of the base surface of a complementary connector. Guide means to be described below enable the two base surfaces to be exactly aligned with one another, in the same plane.

Figure 2:
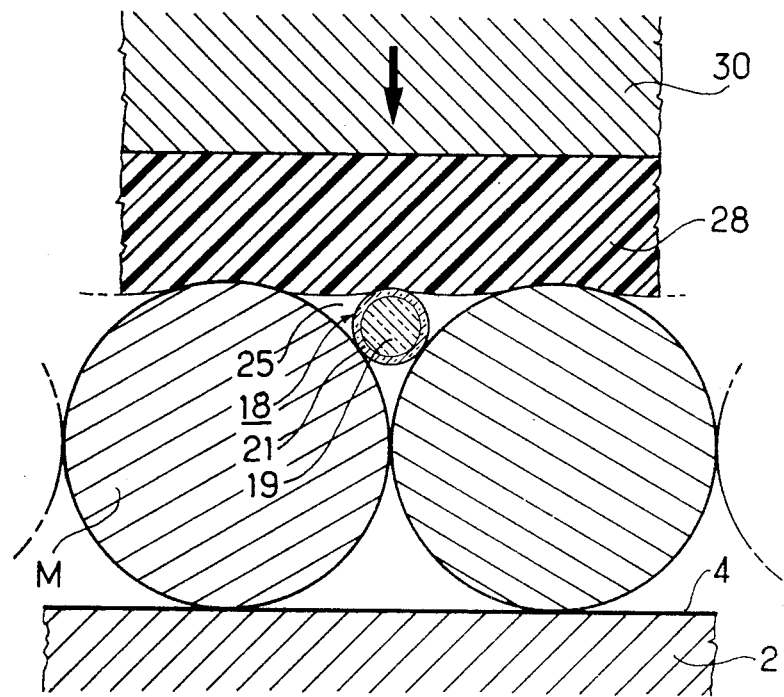
FIG. 2 is a partial view of the same connector in cross-section on a plane parallel to the front surface and passing through the fibre immobilising pad.

The rear portion of the base surface receives a connecting member made, for example, of a plastics material and having on its rear edge a recess 14 designed to receive a multifibre cable 12 to be connected to the connector, complete with its outer sheath. The cable is arranged longitudinally, a few millimeters above the plane of the base surface and at the rear end of this surface. In front of the recess the connection member comprises a sloping portion 16 running down at an angle of 5 to 10 degrees to the vicinity of the base surface. The fibres of the cable are arranged on this sloping surface. The outer sheath of the cable is removed at this point, but the fibres 7 retain their individual plastic sheaths. The fibres are spread out into a fan shape on this sloping surface, so as to form a flat array of fibres extending towards the base surface. The fibres are then bent so as to extend forward parallel to the base surface. Their plastic sheaths are removed to expose the glass. Each fibre 18 comprises a core 19 and glass cladding 21 which has a lower index of refraction than the core, as is well known (see FIG. 2). There are 7 fibres in the example shown in the figure, but there might be 13 or 19 fibres, depending on the type of cable to be connected.

The bends in the fibres at the front and rear edges of the sloping surface 16 avoid subjecting the fibres to longitudinal tension and compression stresses during the longitudinal adjustment of the position of their front ends.

Figure 4:
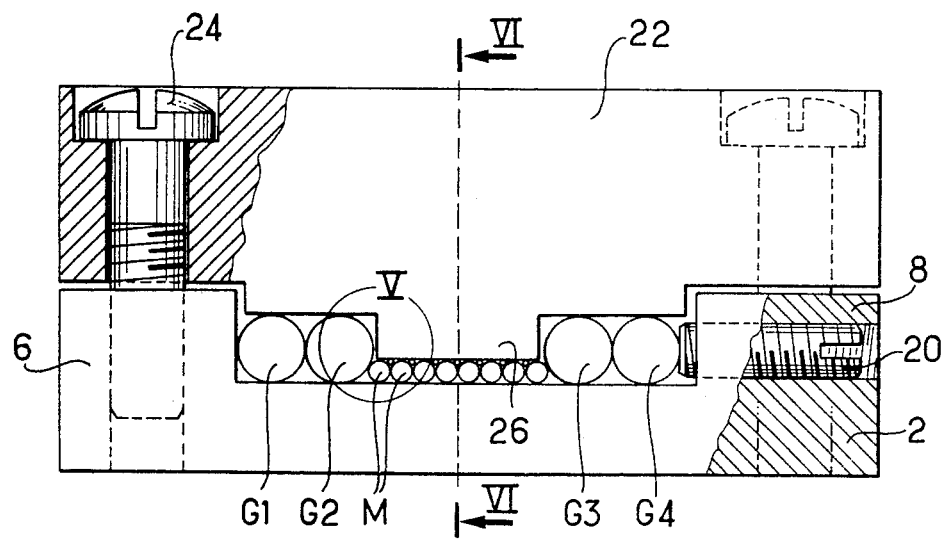
FIG. 4 is a front view of the same connector, partially in cross-section on a plane parallel to the front surface and located behind the fibre immobilising pad.
Figure 5:
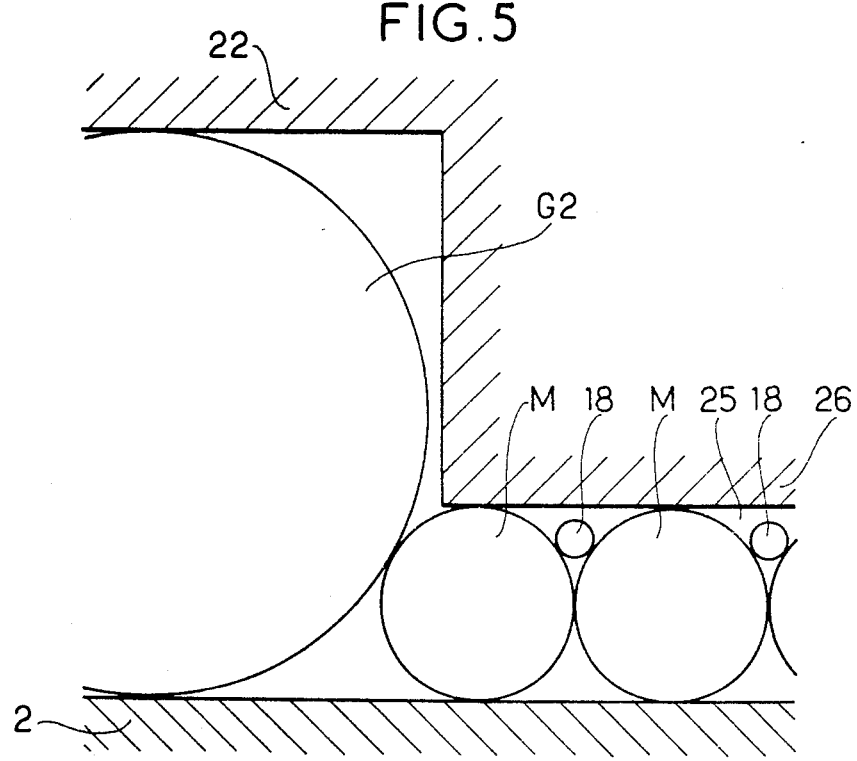
FIG. 5 represents part of FIG. 4 to a larger scale.
Figure 6:
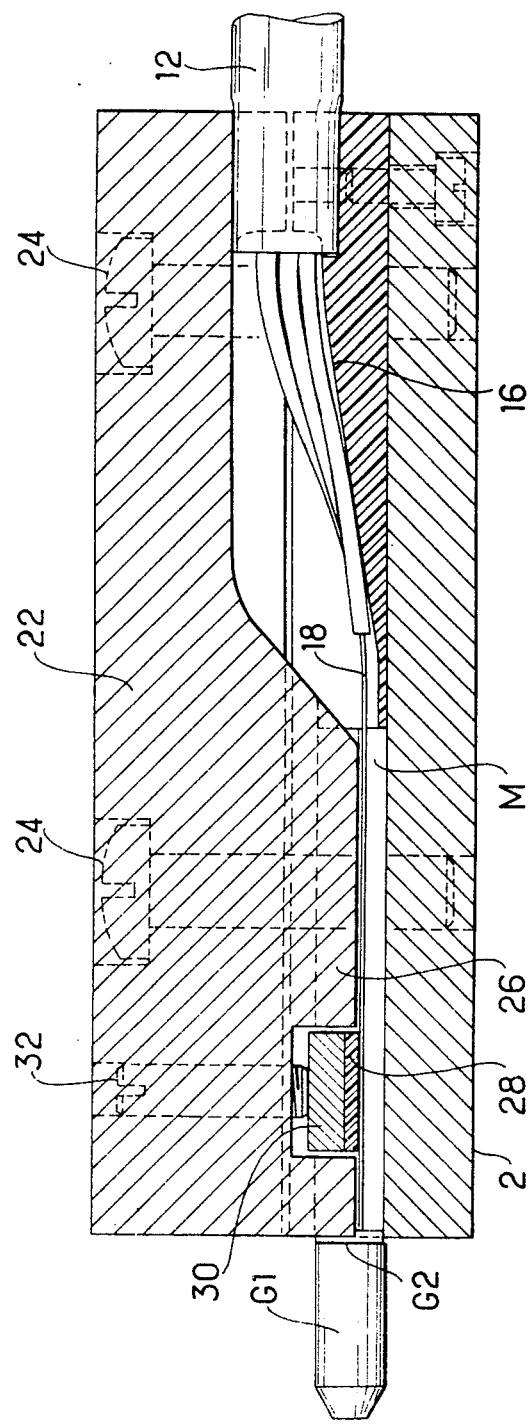
FIG. 6 is a view of the same connector in cross-section on a plane perpendicular to the base and front surfaces.

There follows a description of the locating and guiding means which enable each fibre 18 to be maintained in the correct position relative to the base surface 4 and the connector to be guided relative to a complementary connector so that the two base surfaces are aligned with one another, so aligning the fibres which are maintained in the correct positions relative to the two base surfaces. These means are arranged on the base surface 4, on which are the following components, starting at the lateral support surface 6 (see FIGS. 1 and 4).

- a main guide pin G1 projecting relative to the front surface 11 of the base 2, over a distance of 5 millimeters, for example, its forward end being chamfered;
- a first stop pin G2 with a plane front end projecting forward of the front surface 11 over a small distance of, for example, 5 microns, the plane of the front surface of this pin being perpendicular to its axis;
- a set of locating pins M, there being one more of these pins than there are fibres (i.e. 8 in the present example), the end surfaces of these pins being substantially coplanar with the front surface 11;
- a second stop pin G3 identical to the first and identically arranged relative to the front surface 11; and
- an auxiliary guide pin G4 whose front surface is offset backwards relative to the front surface 11, so as to form a guide recess with a depth which is slightly greater than the projecting length of the main guide pin G1. This auxiliary guide pin is urged towards the lateral support surface 6 by lateral clamping screws 20. These are screwed into threaded holes formed in section 8 of the U-shaped base, which constitutes a support for these lateral clamping screws. In all embodiments of the invention, this support must be fast with the lateral support surface so as to enable the clamping force to be applied. In the example described and shown in this specification, this is achieved by virtue of the fact that both components are part of the base 2. It will be obvious, however, that this could be achieved in other ways, for example by means of a stirrup-shaped bracket passing above pins G1, G2, M, G3 and G4.

The screws 20 clamp all the pins against one another and against the lateral support surface 6. The pins are therefore parallel to one another and to this support surface, in other words perpendicular to the front surface 11, provided that they are maintained in contact with the base surfaces 4 by the previously mentioned clamping means. These comprise a clamping plate 22 which is urged towards the base surface 4 by means of screws 24.

All the previously mentioned pins are made of hard steel and are accurately machined to a cylindrical shape. Such machining can be executed with a high level of accuracy at low cost.

The locating pins have a diameter which is greater than four times the diameter of the fibres, for example 0.55 millimeters if the diameter of the fibres is 125 microns. This is so that the fibres located in the upwardly-facing grooves 25 formed between the pins do not extend above the grooves, remaining below the horizontal plane tangental to the tops of the pins, so as to avoid all risk of the clamping plate coming into contact with the fibres.

The guide and stop pins are preferably of greater diameter, advantageously between 1.5 and three times that of the locating pins, so as to offer increased rigidity. Too large a diameter for these pins would tend to cause the stop pins to ride over the locating pins under the action of the thrust exerted by the lateral clamping screws.

Above the locating pins, the clamping plate 22 has a downwardly projecting central portion 26 so that it can urge both the locating pins and the stop and guide pins against the base surface 4. The positions of the stop pin G2 and guide pin G1 could obviously be reversed.

The metal of the clamping plate 22 is less hard than that of the pins and that of the base surface, so as to avoid distorting the pins and the base surface as a result of the force applied by the screws 24. The plate 22 may be of aluminum alloy, for example, the projecting portion 26 being of mild steel, the base surface being machined from hard steel.

The downwardly projecting central portion 26 of the clamping plate is formed with a housing designed to receive an elastic pad 28 mounted on a metal support 30. This pad is urged downwardly, via its support, by two screws 32 (see FIG. 3), so as to immobilise the fibres 18 in the grooves formed between the locating pins M, the material of the elastic pad penetrating into these grooves (see FIG. 2). The forward ends of the fibres are located in the same plane as those of the locating pins.

The connector which has just been described is a plug connector in that the main guide pin G1 projects beyond the front surface 11 of the connector. It also comprises an auxiliary guide pin G4 of the socket type in that it is recessed relative to the front surface. A given connector could have a plug-type main guide pin and a plug-type auxiliary guide pin, or socket-type main and auxiliary guide pins, in which case it would be a socket-type connector, in that its main guide pin would be recessed. Each type of connector is designed to cooperate with a complementary connector. Specifically, the plug-type or socket-type guide pins are designed to cooperate with socket-type or plug-type guide pins, respectively, of the complementary connector. The plug-type and socket-type main guide pins are designed to prevent relative motion of the connectors in two transverse directions which are both parallel to the front surface. One transverse direction is horizontal, in other words parallel to the base surface. The other is vertical, in other words perpendicular to this surface. The auxiliary guide pins are designed to prevent movement in this vertical direction, as will be explained more clearly below. The socket-type guide pins merely maintain the appropriate gap between the adjacent components so as to enable the projecting guide pins of the complementary connector to slide with slight friction in the recesses formed in front of the socket-type pins. The stop pins are designed to prevent longitudinal movement, or more precisely to limit such movement so as to define the relative longitudinal positions of the two complementary connectors when pushed together.

Figure 7:
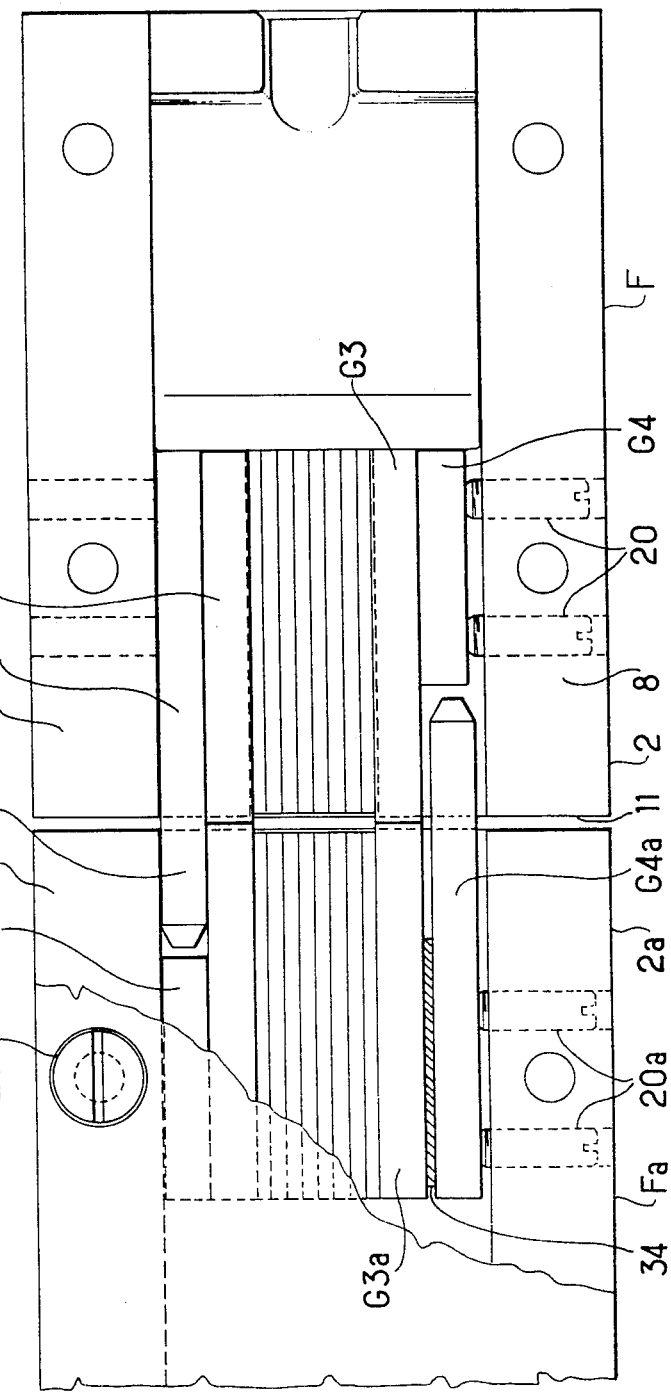
FIG. 7 is a plan view from above showing a connector assembly comprising two complementary connectors, the plug connector being that shown in the preceding figures, and the upper portions of the connectors being partially cut away to show the guide, stop and locating pins.

The plug connector described above, with a projecting main guide pin and a recessed auxiliary guide pin is designed to cooperate with a socket connector comprising a recessed main guide pin and a projecting auxiliary guide pin. This socket connector is shown at Fa in FIGS. 7 and 8, the plug connector already desribed being shown at F. The two connectors are identical, with the exception of the points listed below, the components of connector Fa being designated with the same reference symbols as the corresponding components of connector F, with the addition of the letter a:

the lateral support surface 6a consists of the side section of the U on the righthand side when looking at the front surface, instead of that situated on the lefthand side;

the main guide pin G1a bearing against the lateral support surface is recessed, like pin G4, rather than projecting like pin G1;

the auxiliary guide pin G4a on which the lateral clamping screws 20a act projects like pin G1 rather than being recessed; and a spacer 34 is located between the projecting auxiliary guide pin G4a and the adjacent stop pin G3a. This plane spacer has parallel surfaces. It is required because, as a result of inaccuracies in machining the pins, the set of pins of the socket connector located between the lateral support surface 6a and the auxiliary guide pin G4a may have a total width which is less than that of the set of pins of the plug connector located between the lateral support surface 6 and the auxiliary guide pin G4. This spacer prevents the projecting auxiliary guide pin G4a coming into contact with the stop pin G3 when the connectors are brought together, which would prevent the connectors adopting the correct parallel relationship. The need for such a spacer could obviously be avoided by forming a flat on the stop pin G3 facing the recessed auxiliary guide pin G4. The thickness of the spacer 34 (or the depth of the flat on the pin G3) is very slightly greater than the largest possible value of the difference between the total width of the pins of the two connectors, excepting the auxiliary guide pins.

The risk of the pin G4a coming into contact with the side section 8 of the U forming a support for the lateral clamping screws 20 is avoided by the fact that the width of the base surface is greater than the total width of the pins, which means that the screws 20 must project above the base surface in order to clamp pin G4.

Figure 8:
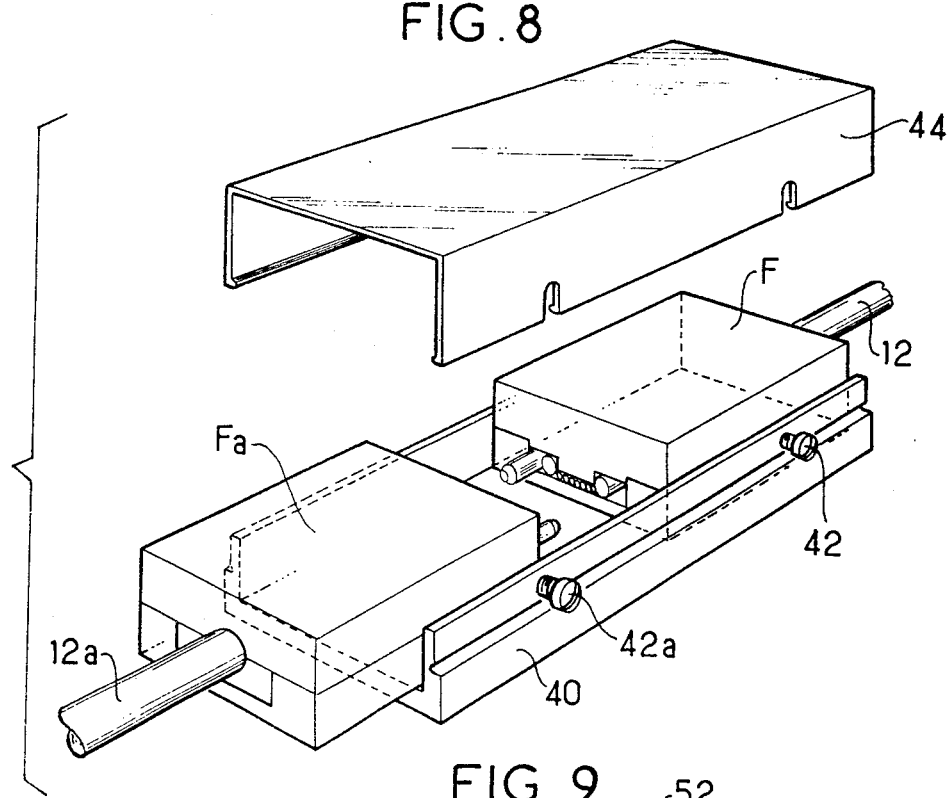
FIG. 8 is a perspective exploded view of the connector assembly shown in FIG. 7, the connector assembly being provided with a locking and protective casing.

When the connectors F and Fa have been engaged with one another to make the connection, they are placed in a casing which may be made, for example, of a plastics material. This casing has two functions. One is to lock the connectors in the appropriate position, and the other is to protect the connectors against entry of dust. Dust could otherwise get in between the two front surfaces which are held slightly apart by the stop pins. A casing of this type is shown in FIG. 8. It comprises a locking plate 40 fitted with locking screws 42 and 42a for connectors F and Fa, and a snap-on protective cover 44.

Figure 9:
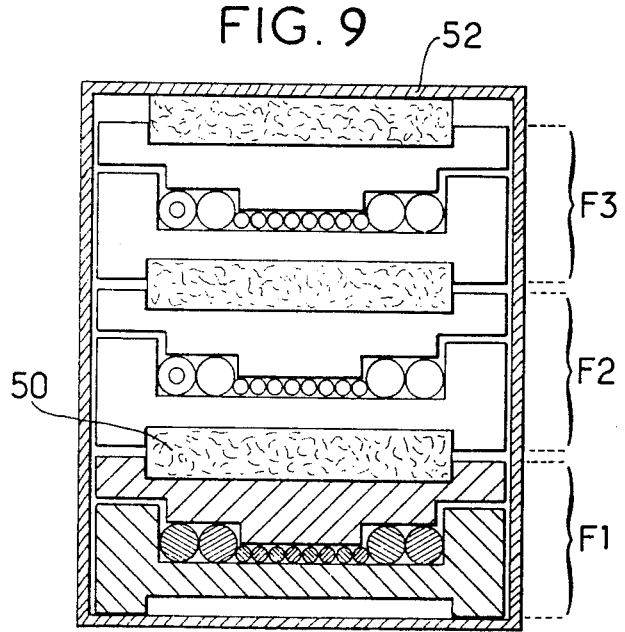
FIG. 9 shows a stack of connectors identical to those shown in the previous figures, except that their upper and lower surfaces are shaped to facilitate stacking, one of the connectors being shown in cross-section on a plane parallel to its front surface.
Figure 13:
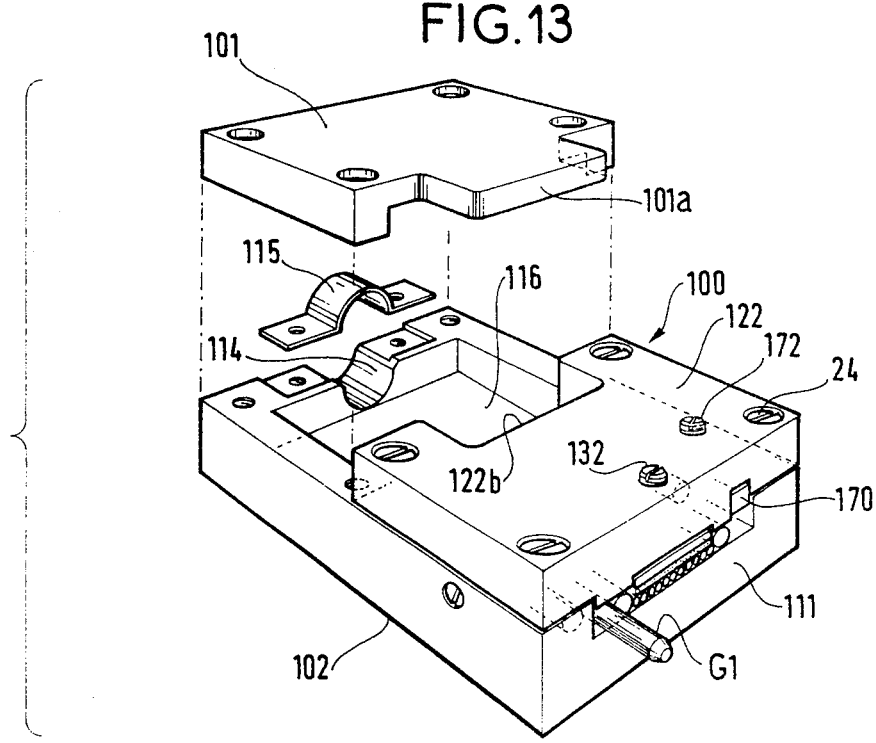
FIG. 13 is a perspective view of the assembled connector, with the cover removed.
Figure 14:
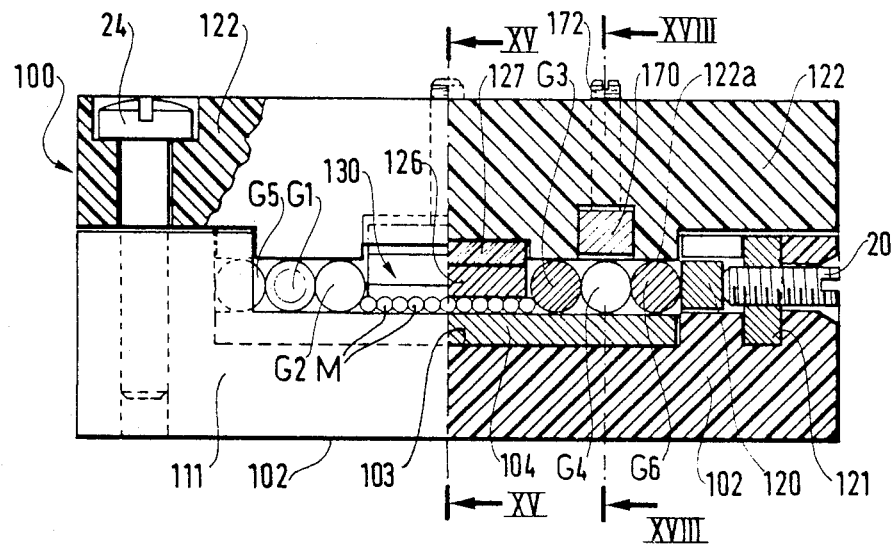
FIG. 14 is a front view of the same connector on the connection side, partially cut away and partially in cross-section on line XI–XIV of FIG. 16.
Figure 15:
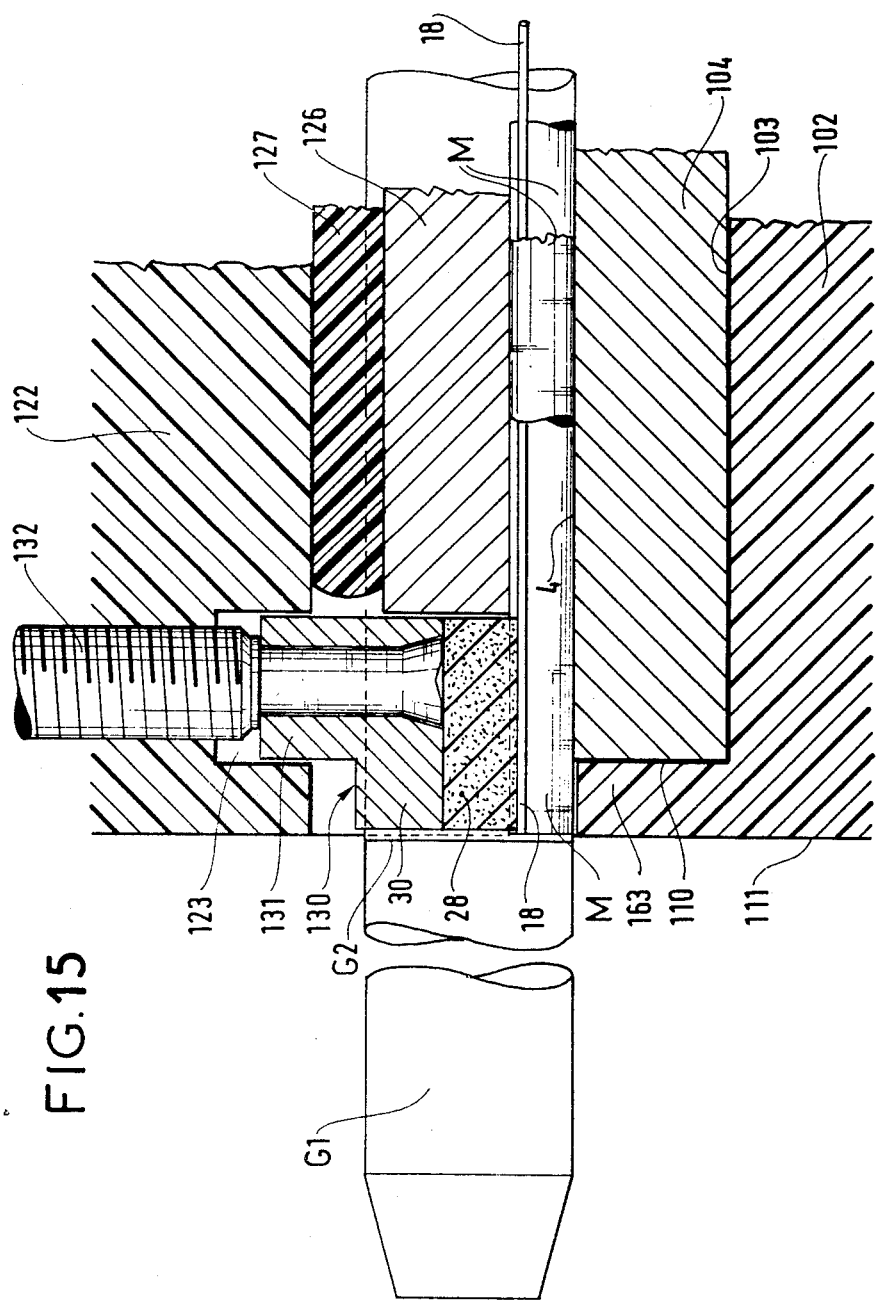
FIG. 15 is a partial cross-section through the same connector to a larger scale, taken about line XV—XV on FIG. 14.

Connectors such as connector F1 can easily be stacked, for example by providing aligned recesses in their upper and lower surfaces, designed to receive elastic pads 50 acting as spacers between the upper surface of a connector such as F1 and the lower surface of a connector such as F2 FIG. 9. The thickness of the pad is sufficient to prevent these two surfaces coming into direct contact with one another. This enables all the plug connectors of a stack to be simultaneously engaged with all the socket connectors of a complementary stack. Any size differences are taken up by deformation of the pads 50, and no significant loads are exerted on the guide pins. The stacked connectors are retained by a flexible sheath 52. Protection and locking means for the two connector stacks may be provided.

FIGS. 10 to 18 concern a second embodiment of a connector in accordance with the invention.

The previously described first embodiment comprises a number of reference surfaces which must be machined with great accuracy as any error in respect of these surfaces produces an error in the relative positions of the fibres to be connected, and so a reduction in the quality in the transmission of the data carried by the fibres in the form of a luminous signal.

Where the U-shaped base is concerned, this highly accurate machining is relatively expensive.

The same applies to the clamping plate, where comparable accuracy is required in that its inwardly directed surface is shaped with projections such as the projection 26 which corresponds to the difference between the dimensions of the guide pins and the locating pins, and in that the projection in the centre portion of the clamping plate is used to centre it relative to the base.

This embodiment also presents certain problems during assembly, in that the optical fibres must be inserted before the clamping plate is attached to the base, and thus before the locating and guide pins have been accurately and finally positioned.

The second embodiment which will now be described incorporates various improvements which are intended to facilitate the manufacture of the connector on an industrial scale, and so to reduce its cost, and also to facilitate assembly, with a view to improving the product from the technical, industrial and commercial points of view.

This objective is realised on the one hand by making all the highly accurate component parts as separate parts with simple geometrical shapes which can be accurately machined more easily than complex components, and on the other hand by assembling the component parts of the connector in a casing moulded from a material such as a polyamide or a hard rubber, for example, or from a metal alloy of appropriate hardness.

In particular, the base surface is formed as a simple metal plate, at least one surface of which is accurately machined. The lateral support surface is provided by a straight rigid pin of the same material and the same diameter as the guide and stop pins.

With regard to the structure within which the connector in accordance with the invention is assembled, one improvement consists in the fact that this structure consists of a casing comprising a base which is enclosed by two separate cover members, a "clamping plate" and a "cover".

This new arrangement enables the connector to be assembled independently of the insertion and attachment of the optical fibres.

Specifically, the assembly in the casing of all the component parts of the connector, the guide, locating and clamping means, is completely terminated before the optical fibres are inserted with the required accuracy.

This means that this assembly stage can be carried out in a laboratory with all the necessary measurement instruments available; the assembled connectors then being distributed and being easy to use in optical fibre connector assemblies.

The prepared fibres are inserted by lifting the cover, the fibres being immobilised by the immobilising pad once they are accurately positioned, the casing then being closed and the cover fastened down again. The connector can then be connected to another connector.

The insertion of the fibres is facilitated by a special arrangement of the component parts of the connector to the rear of the locating pins.

This is achieved by recessing the rear edge of the locating pin clamping plate relative to the rear edges of the pins, the shape or arrangement of the clamping plate providing access to these ends when the cover is removed.

Another improvement is intended to offer improved immobilisation of the front ends of the fibres in the locating grooves. This is achieved by extending the immobilising pad as close as possible to the front surface of the connector, this being achieved by appropriately arranging the housing designed to retain the immobilising pad and formed in the central portion of the clamping plate, this central portion serving to clamp the locating pins against the base surface. Specifically, this housing opens not only onto the lower surface of the central portion of the clamping plate, in other words onto the surface of this portion facing the holding pins, but also onto the front surface of this plate. The pad is prevented from escaping towards the front by providing its support with an upwardly or laterally directed projection. This projection engages in an appropriate recess in the clamping plate.

Finally, it may be advantageous, with a view to clamping the locating pins by means of the central portion of the clamping plate, to produce the downwardly extending projection of the central portion of the plate by making the plate itself generally flat and providing in the central portion a plane clamping block attached to the bottom of the central portion via the intermediary of a layer of elastic material facilitating a uniform distribution of the clamping force.

The second embodiment will now be described with reference to FIGS. 10 to 18.

It should be understood that the components with the same functions as in the first embodiment and with exactly the same structure carry the same reference numerals, and that the parts of the description of the first embodiment relating to the presence, structure and function of these components remain valid in the absence of any specific indication to the contrary.

The connector constituting the second embodiment of the invention comprises a casing 100 consisting of a prism-shaped base 102 of U-shaped cross-section (see FIGS. 10, 12 and 13), a clamping plate 122 placed on the forward part of the base, and a cover 101 placed on the rear part of the base 102.

The casing may be moulded, for example from a plastics material such as a polyamide or a hard rubber, or from a metal alloy. The horizontal centre section of the U-shaped base has a width which is greater than the height of the side sections. Its upper surface 103 supports a base plate 104 whose upper surface 4 constitutes the "base surface" previously mentioned. This surface 4 forms a reference plane, which is horizontal in this instance, and its surface is accurately machined from a hard rigid metal constituting the plate 104. One of the side sections 106 of the U provides a lateral support for a lateral support pin or reference pin G5 which is placed on the base plate 104, on the surface 4 thereof, and one generatrix of which forms the rectilinear lateral support surface 6 mentioned in connection with the first embodiment. This pin is parallel to the guide pins G1, G2, G3 and G4, and is of the same diameter and material as these pins and machined to the same accuracy. The inwardly directed surfaces of both vertical side sections 106 and 108 locate respective identical pins G5 and G6 which extend to a position adjacent the front surface of the connector, so that either of these two pins can be used as a lateral support surface, depending on whether a plug or socket connector is to be made, as has already been explained, the base 102 being completely symmetrical.

The base plate 104 is rectangular and has a front edge 110 (FIGS. 11 and 12), a rear edge opposite the front edge, and two lateral edges where it intersects the side sections 106 and 108 of the base 102. The front surface 111 of the base 102 is plane and perpendicular to the generatrices of the prism which define the longitudinal direction.

The rear portion of the base 2 comprises on its rear edge a recess 114 which is longitudinally aligned as in the first embodiment and is designed to receive a multifibre cable 12 to be connected to the connector and which is attached to the connector by means of a cable grip 115.

There follows a description of the locating and guide means which enable each fibre 18 to be located in the correct position relative to the base plate 104 and which guide the connector relative to a complementary connector so as to align the two base surfaces 4 and the locating pins M thereof so as to align the fibres which are maintained in the correct positions relative to these two base surfaces and these pins. These means are arranged on the base surface 4 of the base plate 104, which supports the following component parts, in the direction away from the lateral edge 106 (see FIGS. 10 and 11):

the reference and guide pin G5 which is of the same diameter and has the same properties as the other guide pins, one of its generatrices forming the rectilinear lateral support 6, a plug-type main guide pin G1 projecting relative to the front surface 111 of the base 102, for example by 10 millimeters, with its forward end chamfered, a first stop pin G2 with a plane forward end projecting slightly beyond the front surface 111, for example by 5 microns, the plane of the front surface of this pin being perpendicular to its length, a set of locating pins M, there being one more of these pins than there are fibres, so that there are eleven such pins in this instance, the ends of the pins being substantially coplanar with the front surface 111 of the base 102, a second stop pin G3 identical to the first and identically arranged relative to the front surface 111, and an auxiliary guide pin G4 whose front surface is recessed relative to the front surface 111, so as to form a guide recess with a depth which is slightly greater than the projecting length of the main guide pin G1. This auxiliary guide pin is urged towards the lateral support G5 by a lateral clamping screw 20, through the intermediary of a stirrup 120 and the pin G6. This screw cooperates with a nut 121 housed in the side section 108 of the U-shaped base 102, which thus constitutes a support for this lateral clamping screw (see FIG. 14). The above-mentioned clamping means comprise a clamping plate 122 covering approximately half of the length of the base and urged towards the base by means of screws 24.

The clamping plate 122 is designed to clamp both the locating pins and the guide pins, including the reference pin. Its central portion, located above the guide pins, comprises a downwardly extending projection 122a (FIGS. 12 and 14) so as the centre the clamping plate relative to the base 102 and also to clamp the guide pins, including the reference pin, and the stop pins against the base surface 4 of the base plate 104 located in the base 102. For this reason, this projection is of the same width as the central portion of the base, which is also the width of the base plate 104.

The central portion of the projection 122a, disposed above the locating pins, comprises a second "projection" formed by a clamping block 126 attached to the bottom of this central portion through the intermediary of an elastic rubber sole plate 127, which is compressed to exert the necessary clamping force on the locating pins.

It will be obvious that the clamping action of the plate 126 could be provided by other, conventional means, such as an independent clamping screw. In this case the clamping of the locating pins must be carried out at the same time as the immobilisation of the set of pins in the casing.

The material of the clamping plate 122 and the clamping block 126 is less hard than that of the pins and that of the base plate 104, so as to avoid distortion of the pins and the base plate by the action of the clamping screws 24. The clamping plate 122 may be of an aluminum alloy, for example, the clamping block 126 of mild steel and the base plate 104 of hard steel.

The central portion of the clamping plate 122 comprises, in front of the clamping block 126, a recess 123 which extends as far as its front surface, which is aligned with the front surface 111 of the base 102 of the connector, this recess receiving a fibre-immobilising pad 130. This immobilising pad comprises a support 30 moulded from a hard plastics material or an alloy, having in its rear part an upwardly directed projection 131 which engages in said recess 123 in the clamping plate 122 so as to prevent forward movement. At the bottom, the pad support 30 comprises an elastic pad 28 bonded to its lower surface and which bears on and immobilises the optical fibres. This pad is urged downwards, through the intermediary of its support, by a screw 132 (see FIG. 15), so as to immobilise the fibres 18 in the grooves formed between the locating pins M, by virtue of the penetration of the elastic pad into these grooves.

The connector which has just been described is a plug connector in that it has a printing main guide pin G1, as explained previously. It also comprises a recessed auxiliary guide pin G4.

Figure 16:
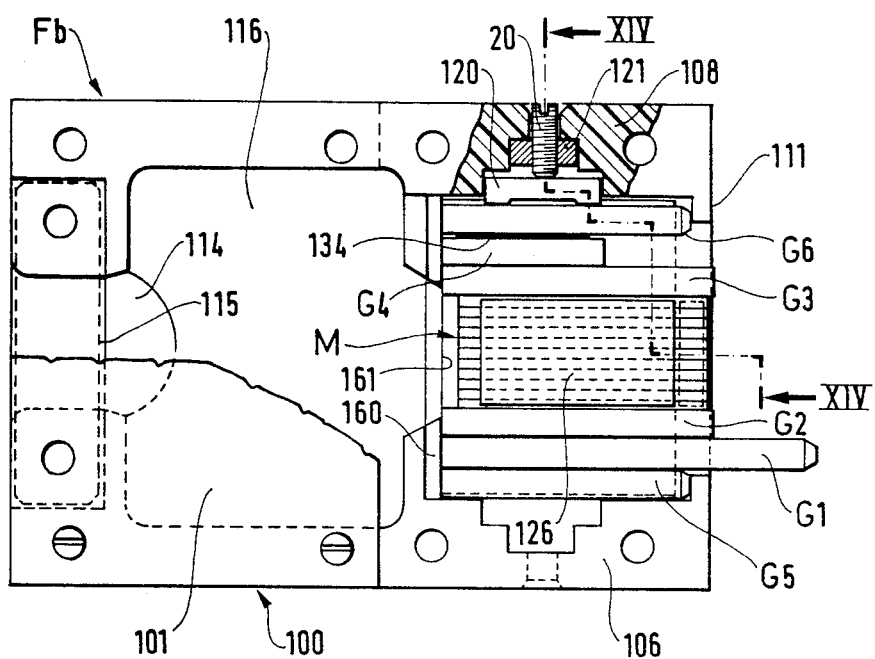
FIG. 16 is a plan view from above of the same connector with the clamping plate removed and the rear cover partially cut away.
Figure 17:
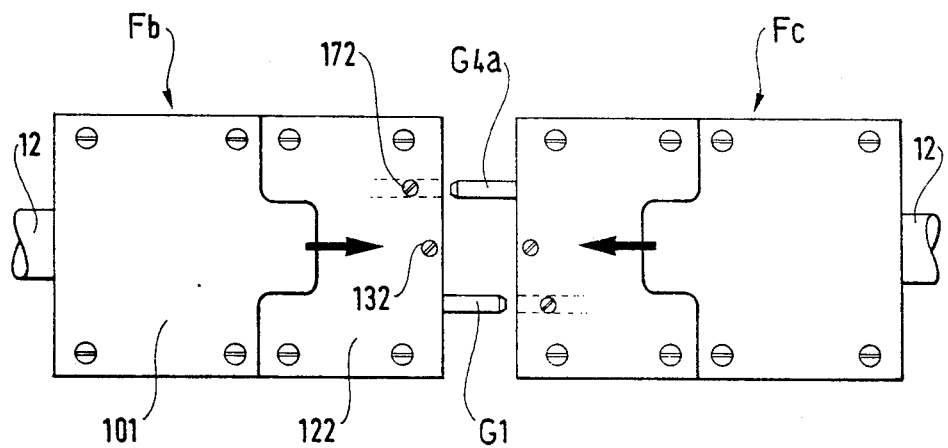
FIG. 17 is a plan view which shows a connector assembly comprising two connectors in accordance with the invention.

This plug connector Fb (see FIGS. 13 and 16) with its plug-type main guide pin and socket-type auxiliary guide pin is designed to cooperate with a socket connector Fc (FIG. 17 which comprises a socket-type main guide pin and a plug-type auxiliary guide pin G4a. As described in connection with the first embodiment, the socket connector comprises a spacer placed between its plug-type auxiliary guide pin and the adjacent stop pin. This plane spacer has parallel surfaces and its thickness is slightly greater than the largest possible difference between the total widths of the pins of the two connectors, with the exception of the auxiliary guide pins, with a view to eliminating the risk of the plug-type auxiliary guide pin G4a coming into contact with the stop pin G3. The risk of pin G4a coming into contact with pin G6 is avoided in a similar manner by placing a spacer 134 which is twice as thick as the aforementioned spacer between the stop pin G4 and pin G6.

To facilitate the insertion of pin G4a between the base plate 104 and the clamping plate 122 without it being necessary to slacken off the screws 24 which retain the clamping plate, the clamping plate comprises a recess containing a support bracket 170, located above the space which will be occupied by the projecting pin G4a, in other words in front of pin G4.

Figure 18:
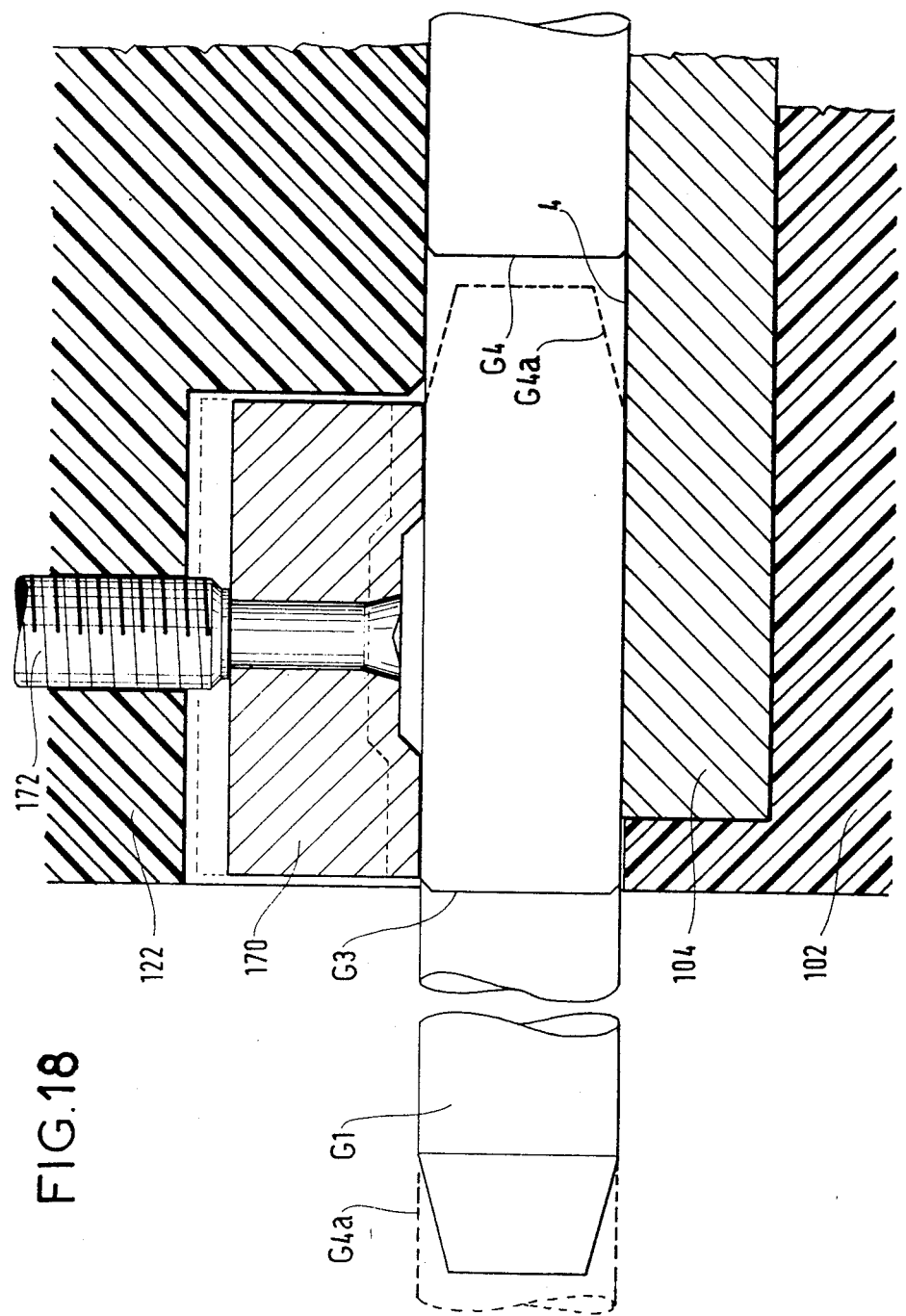
FIG. 18 is a partial cross-section through the same connector to a larger scale, taken about line XVIII—XVIII of FIG. 14.

Before the pin G4a is inserted, in other words when connector Fb is not engaged with the complementary connector Fc, this bracket is raised by means of the captive screw 172. After the insertion of the pin G4a this screw is used to immobilise the bracket on the pin so as to clamp it against the base plate 104, as shown in FIG. 18, ensuring an accurate connection and immobilising the two connectors relative to one another.

The connector Fc obviously comprises an identical bracket facilitating the insertion of the projecting pin G1. The only differences between the connectors Fb and Fc relate to the positions and thicknesses of the spacers 134.

Note that the upper surface 103 of the base 102 is provided with back stops 160 for all the pins G and front stops 162 for pins G5 and G6, and is further provided with a rear shoulder 161 and a front shoulder 163 for the base plate 104, these shoulders forming with the side sections 106 and 108 of the base a housing in which the base plate 104 is located (see FIGS. 12 and 16).

At the rear of the base 102 the shoulder 161 opens into a recess 116 which enables the optical fibres to be distributed among and inserted into the grooves between the locating pins. This recess is closed by the cover 101. At the front of this cover is a projection 101a located above the rear ends of the locating pins M. This projection engages a corresponding recess 122b in the rear of the clamping plate 122. This recess enables this plate to be made sufficiently long to facilitate its attachment to the base 102 by means of screws, and, when the cover is removed, provides easy access from above for the insertion of the ends of the optical fibres between the rear ends of the locating pins.

The upper surface of the shoulder 163 is preferably substantially coplanar with the base surface 4. The forward edge of this upper surface intersects the front surface 111 of the base 102.

Note that in another embodiment (not shown) the shoulder 163 could be eliminated. In this case, the forward edge 110 of the base plate 104 would extend as far as the front surface 111 of the base 102.

Finally, note that the guide pin G6 may be dispensed with if, for technical and/or hardware reasons, it is not necessary to produce a "hermaphrodite" (plug and socket) connector and if it is not necessary to guide the guide pin G4a on all four sides. In this case this pin is merely guided relative to the base surface 4.

Figure 19:
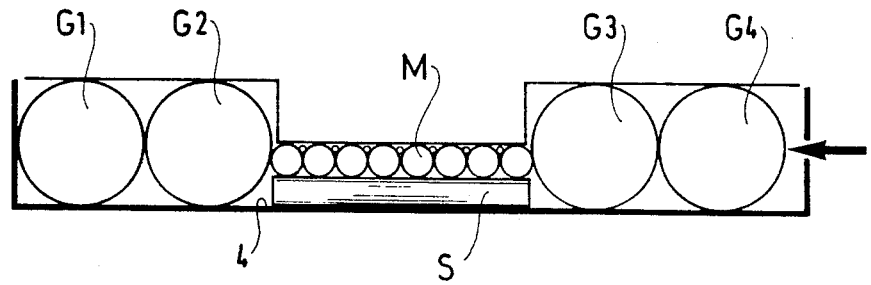
FIG. 19 is a schematic representation of a third embodiment of a connector in accordance with the invention showing the general arrangement of its principal components.
Figure 20:
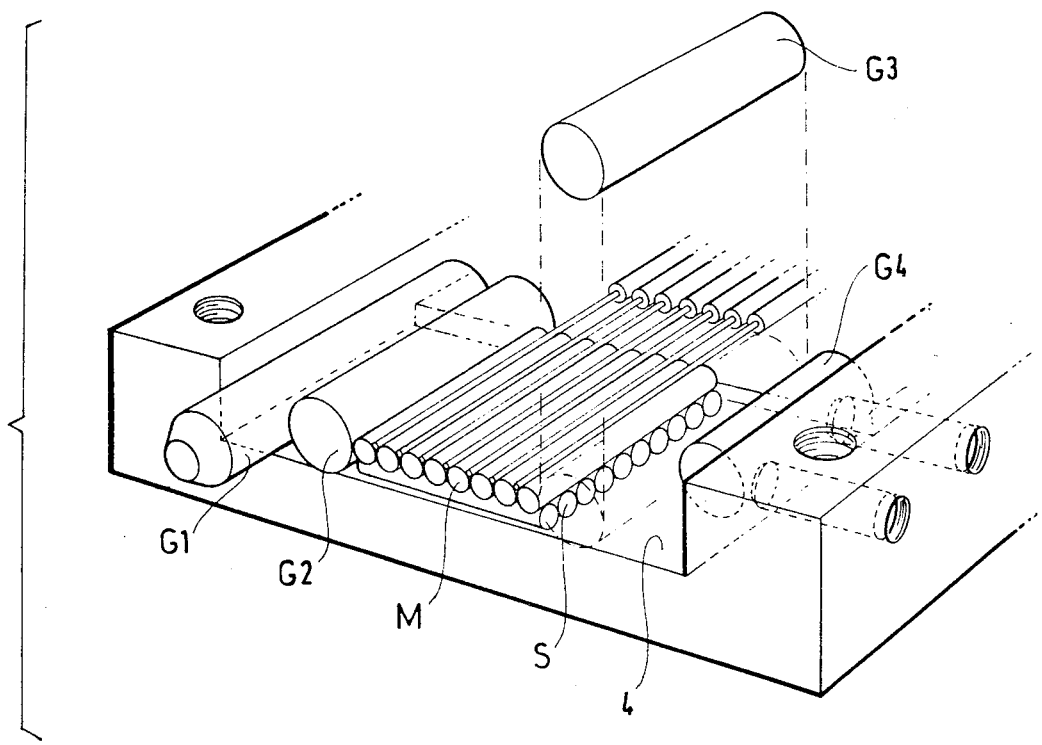
FIG. 20 is a schematic partial view in perspective of some of the components of the connector of FIG. 19.

The second embodiment described above is particularly applicable to multimode optical fibres having a diameter of 125 microns, for example. In that case the locating pins M can have a diameter of 0.5 mm and the guide pins can have a diameter of 1.5 mm (i.e. three times that of the locating pins). This is generally sufficient to ensure that male guide pins such as G1 are in no risk of being bent during connection. However, fibres of smaller diameter are also is use, e.g. 80 microns diameter, which would lead to the locating pins M being reduced in proportion to ensure the same positioning accuracy of the fibres above the base plate in spite of the small angle of the V-shaped groove in which they are laid. This leads to a requirement, particularly if the male guide pins are to be robust, that the male guide pins should have four times the diameter of the locating pins, which increases the risk that the lateral compression of the pins against each other will cause the guide pins to move over the locating pins. This risk can be avoided by using a third embodiment of the invention which is described with reference to FIGS. 19 and 20. These figures are analogous to FIGS. 1 and 3, and indeed it can be seen that the third embodiment is a modification of the first with many components remaining unaltered.

In the third embodiment, which may be advantageous for connectors having guide pins of more than twice the diameter of the locating pins, a distance piece in the form of a layer of "riser" pins S is inserted between the locating pins M and the surface of the base 4. The "riser" pins S are made of hard steel and are disposed side by side on the base perpendicularly to the locating pins. The diameter of the "riser" pins may be the same as that of the locating pins, for example. The riser pins are long enough to support all the locating pins and short enough not to hinder the approach of the pins such as G2 and G3 situated on either side of the locating pins. The ends of the riser pins are slightly chamfered to avoid their jamming under a stop pin G2 or G3 during assembly. This champer is too small to be shown in the figures.

We claim:
1. A fibre-to-fibre connector for multi-fibre optical fibre cables for making multiple fibre-to-fibre connections with a complementary connector, said connector having a "front" surface defining a common connection plane with said complementary connector, said connector further comprising:
  a base having on upper surface thereof a hard, rigid plane base surface for providing a reference plane,
  at least three hard, rigid cylindrical locating pins on said base surface and extending parallel to and in side-by-side contact with one another, their front ends being located in the vicinity of the front surface of the connector without projecting beyond the front surface and forming fibre-locating grooves between the facing portions of their side surfaces,
  means for clamping the locating pins against the base surface to maintain contact between the lateral surfaces of said pins and said base surface,
  an elastic pad for immobilizing the fibres disposed adjacent the front face and overlying at least a portion of said locating pins,
  means for clamping the elastic pad onto the locating pins with sufficient force to deform the pad where it contacts the pins and/or the fibres so that it presses the fibres into the locating grooves formed between the pins,
  a rectilinear side support extending perpendicular to said front surface and parallel to and above said base surface,
  a cylindrical main guide pin located on said base surface parallel to said side support between said side support and said set of locating pins, the front end of said guide pin being offset axially relative to the front edge of the connector to permit plug-/socket cooperation of the connector and an associated complementary connector, and for guiding both connectors in relation to each other, means for clamping the guide pin against the base surface, and lateral clamping means for clamping the set of locating pins against the main guide pin and the main guide pin against said side support.

2. A connector according to claim 1, wherein said base is of U-shaped cross-section and wherein an upper surface of the portion forming the central section of the U constitutes said base surface, one side section of the U forming a support for said lateral clamping means and the other side section of the U having a plane inwardly directed surface substantially perpendicular to the plane of the base surface and constituting said lateral support surface.

3. A connector according to claim 1, wherein the main guide pin projects forward over a distance of more than one millimeter so that the connector acts as a plug connector for a complementary socket connector by engagement of the projecting guide pin in a recess in the socket connector.

4. A connector according to claim 1, wherein the front end of the main guide pin is offset backwards relative to the front of the connector to form a guide recess with a depth greater than one millimeter, so that the connector acts as a socket connector with a complementary plug connector by engagement of a projecting pin on the plug connector in the recess formed in this manner in front of the main guide pin.

5. A connector according to claim 1, comprising a cylindrical auxiliary guide pin located on the base surface parallel to the locating pins and between the latter and said lateral clamping means, offset axially relative to the front of the connector.

6. A connector according to claim 1, comprising:
two cylindrical stop pins located on said base surface parallel to and one each side of said locating pins, said stop pins being clamped in the lateral direction by said lateral clamping means, and their front surfaces constituting plane stop surfaces perpendicular to the pin axes, and
means for clamping said pins against the base surface,
the front ends of the locating pins being offset backwards relative to the stop surfaces so as to avoid said front ends coming into contact with the front surfaces of the locating pins of a complementary connector, the offset distance being less than 0.02 millimeters.

7. A connector according to claim 6, wherein:
all said guide and stop pins are of the same diameter, all the locating pins having a common diameter which is less than that of the guide and stop pins,
said means for clamping the locating guide and stop pins comprising a clamping plate bearing on the pins and having in its central region a downwardly projecting portion which bears on the set of locating pins, and
the material of the clamping plate being softer than that of said pins and said base surface and harder than that of the pad.

8. A connector according to claim 7, wherein the diameter of the guide and stop pins is between 1.5 and 3 times that of the locating pins.

9. A connector according to claim 7, wherein the following set of components are arranged side by side on the base surface:
a side support surface,
a main guide pin and a first stop pin,
a set of locating pins,
a second stop-pin,
and wherein said connector further comprises a flat spacer, a cylindrical auxiliary guide pin being of the same diameter as the second stop pin and being clamped against the base surface by a clamping plate, part of said auxiliary guide pin projecting forward relative to the connector over a distance greater than one millimeter,
and wherein said lateral clamping means, and said spacer are located between the second stop pin and the auxiliary guide pin and are sufficiently thick to prevent the projecting auxiliary guide pin from coming into contact with the second stop pin of a complementary connector comprising the same set of components, with the exception of the spacer, in face to face arrangement, and the auxiliary guide pin of the complementary connector being offset backwards.

10. A fibre-to-fibre connector for multifibre optical fibre cables according to claim 1, wherein the base comprises a base member supporting a base plate made from a harder material than that of the other components, the base surface consisting of the upper surface of the base plate, easily machined accurately and being of simple shape.

11. A fibre-to-fibre connector for multifibre optical fibre cables according to claim 1, wherein said rectilinear lateral support surface is formed by a cylindrical reference pin of the same material and of the same diameter as the guide pin, said references pin being clamped against a base plate by said means for clamping the guide pin and located in the lateral direction by a shoulder on a base member which supports the base plate and constitutes part of the base.

12. A fibre-to-fibre connector for multifibre optical fibre cables according to claim 1, wherein:
the means for clamping the guide pin comprises a clamping plate, and
the means for clamping the locating pins comprises a clamping block placed beneath the clamping plate, and a layer of an elastic material being placed between said clamping block and said clamping plate.

13. A fibre-to-fibre connector for multifibre optical fibre cables according to claim 1, comprising:
a fibre-immobilizing pad made of an elastic material, and
means for clamping the immobilizing pad against the locating pins with sufficient force to deform the pad where it contacts the pins so that it enters the locating grooves formed between the pins so as to immobilize the fibres located in these grooves, said connector being characterized in that the fibre-immobilizing pad extends substantially to the front surface of the connector.

14. A fibre-to-fibre connector for multifibre optical fibre cables according to claim 13, wherein the fibre immobilising pad has in its rear portion an upwardly directed projection which engages in a corresponding recess in a plate attached to the base so as to prevent the pad escaping towards the front.

15. A fibre-to-fibre connector for multifibre optical fibre cables according to claim 1, wherein the means for clamping the guide pin and locating pins comprises a clamping plate which covers the forward section of the base, said plate comprising means permitting access from above to the rear ends of the locating pins so as to enable the optical fibres to be placed between these rear ends after the guide pin and locating pins have been clamped in position by the clamping means.

16. A fibre-to-fibre connector for multifibre optical fibre cables according to claim 15, further comprising a removeable cover which covers the rear section of the base and enables the multifibre cable to be attached and the fibres to be inserted into the front section of the connector, independently of the mounting of the guide means.

17. A fibre-to-fibre connector for multifibre optical cables according to claim 1, further comprising a socket-type guide pin which is recessed relative to the front end of the fibres so as to form a free space in front of the pin and between the base surface and a clamping plate constituting part of said clamping means, and a support bracket housed in this clamping plate above the free space being provided with means for withdrawing it vertically upwards so as to facilitate the insertion into the free space of a plug-type guide pin of a complementary connector, and for lowering it following such insertion so as to clamp the plug-type guide pin against the base surface and to simultaneously attach the two connectors together.

* * * * *